United States Patent
Proctor, Jr. et al.

(10) Patent No.: US 7,227,907 B2
(45) Date of Patent: Jun. 5, 2007

(54) ANTENNA ADAPTATION COMPARISON METHOD FOR HIGH MOBILITY

(75) Inventors: James A. Proctor, Jr., Melbourne Beach, FL (US); Carlo Amalfitano, Melbourne Beach, FL (US); Kil H. Ryu, West Melbourne, FL (US)

(73) Assignee: IPR Licensing, Inc., Wilmington, DE (US)

( * ) Notice: Subject to any disclaimer, the term of this patent is extended or adjusted under 35 U.S.C. 154(b) by 726 days.

(21) Appl. No.: 10/386,364

(22) Filed: Mar. 10, 2003
(Under 37 CFR 1.47)

(65) Prior Publication Data
US 2004/0009794 A1 Jan. 15, 2004

Related U.S. Application Data

(60) Provisional application No. 60/363,669, filed on Mar. 11, 2002, provisional application No. 60/363,214, filed on Mar. 8, 2002.

(51) Int. Cl.
*H04K 1/02* (2006.01)
*H04L 25/03* (2006.01)
*H04L 25/49* (2006.01)

(52) U.S. Cl. .................. 375/296; 375/295; 455/562.1

(58) Field of Classification Search ............... 375/295, 375/296; 455/575.7, 562.1; 342/372, 373, 342/368; 343/834, 835; 370/347
See application file for complete search history.

(56) References Cited

U.S. PATENT DOCUMENTS

| | | | |
|---|---|---|---|
| 5,303,240 A * | 4/1994 | Borras et al. | 370/347 |
| 6,100,843 A * | 8/2000 | Proctor et al. | 342/368 |
| 6,229,481 B1 | 5/2001 | Katz | |
| 6,304,215 B1 * | 10/2001 | Proctor et al. | 342/372 |
| 6,400,317 B2 * | 6/2002 | Rouphael et al. | 342/367 |
| 6,600,456 B2 * | 7/2003 | Gothard et al. | 343/834 |
| 6,697,642 B1 * | 2/2004 | Thomas | 455/562.1 |
| 2001/0031648 A1 * | 10/2001 | Proctor et al. | 455/562 |

* cited by examiner

*Primary Examiner*—Phuong Phu
(74) *Attorney, Agent, or Firm*—Volpe & Koenig, P.C.

(57) ABSTRACT

A system causes a scan angle of a directional antenna to change temporarily from a current scan angle to at least one trial scan angle during reception of predetermined portions of an information carrying signal. At the trial scan angle(s), a trial metric associated with each trial scan angle is determined by the system. The system then selects a next scan angle based on the trial metrics. Examples of predetermined portions of the information carrying signal include the Power Control Bit (PCB) and certain symbol periods of the Forward Error Correction (FEC) block.

40 Claims, 11 Drawing Sheets

| RFdispatch | | □|□|× |

Power Control [1.5] Parameters | Jakes and Other Parameters

[1.9] GHz  Target SNR [6]
[60] Unit Rotation (Deg./sec.)
[0.67] Sigma of Gauss prob.(dB) in power meas, @ BTS
[3] % of Power Control bits in error (Poisson Distribution)

[10] Antenna Steps
☑ Steering Confirmation Required
☐ DMM Inactive
[7] Repeat before decision
[-1.0] Min. HeartBeat detect. (dB)

| User@ | MpH | Punct. | antS | ActDiv |
|---|---|---|---|---|
| 1 | 3 | 16 | ☑ #1 | ☐ |
| 0 | 5 | 20000 | ☐ #2 | ☐ |
| 0 | 35 | 20000 | ☐ #3 | ☐ |
| 0 | 45 | 20000 | ☐ #4 | ☐ |
| 0 | 65 | 20000 | ☐ #5 | ☐ |

Histogram will collect this data type:
Signal with no power control
Signal after PContr. applied
[SNR - TargetSNR]
[SNR - TargetSNR] excl DMM
abs. of [SNR - TargetSNR]
abs. of [SNR - T.SNR] excl DMM
Power Setting of Remote
Delay of HartBeat ok

[Power Control Simulation]
Showing User #s [1]
Samples per sec. [800]

[Histogram [Excl. group#1]]
[Histogram for User #1 only]
[Clear Histogram]

Stop Puncturing group #1 at milliseconds: [20000]

[Power Contr. Sim Speed loop [Sigmas of selected Histogram]]

[Power Contr. Sim Speed loop [CDFs of selected Histogram]]

[Loop on Minimum Heartbeat Detection]

From [1]  To [-6]  Steps [14]

[Cut at % of multiple CDFs]
[Fluctuations of CB error Rate]
[Repeat Transition]

Multiplier or Increment [2]
Cut at CDF % [1]
Line Thickness [2]
Speed [10]  # [ ]

ANTENNA ADAPTATION COMPARISON METHOD FOR HIGH MOBILITY

RELATED APPLICATION(S)

This application claims the benefit of U.S. Provisional Application No. 60/363,669, filed on Mar. 11, 2002 and U.S. Provisional Application No. 60/363,214, filed Mar. 8, 2002; the entire teachings of the above application(s) are incorporated herein by reference.

BACKGROUND OF THE INVENTION

Code Division Multiple Access (CDMA) communication systems may be used to provide wireless communications between a base station and one or more field units. The base station is typically a computer controlled set of transceivers that are interconnected to a land-based public switched telephone network (PSTN). The base station includes an antenna apparatus for sending forward link radio frequency signals to the field units. The base station antenna is also responsible for receiving reverse link radio frequency signals transmitted from each field unit.

Each field unit also contains an antenna apparatus for the reception of the forward link signals and for transmission of the reverse links signals. A typical field unit is a digital cellular telephone handset or a personal computer coupled to a cellular modem. In CDMA cellular systems, multiple field units may transmit and receive signals on the same frequency but with different codes, to permit detection of signals on a per unit basis.

The most common type of antenna used to transmit and receive signals at a field unit is a mono-pole or omni-antenna. This type of antenna consists of a single wire or antenna element that is coupled to a transceiver within the field unit. The transceiver receives reverse link signals to be transmitted from circuitry within the field unit and modulates the signals onto the antenna element at a specific frequency assigned to that field unit. Forward link signals received by the antenna element at a specific frequency are demodulated by the transceiver and supplied to processing circuitry within the field unit.

The signal transmitted from a monopole antenna is omni-directional in nature. That is, the signal is sent with the same signal strength in all directions in a generally horizontal plane. Reception of a signal with a monopole antenna element is likewise omni-directional. A monopole antenna does not differentiate in its ability to detect a signal in one direction versus detection of the same or a different signal coming from another direction.

A second type of antenna that may be used by field units is described in U.S. Pat. No. 5,617,102. The system described therein provides a directional antenna comprising two antenna elements mounted on the outer case of a laptop computer. The system includes a phase shifter attached to the two elements. The phase shifter may be switched on or off in order to affect the phase of signals transmitted or received during communications to and from the computer. By switching the phase shifter on, the antenna transmit pattern may be adapted to a predetermined hemispherical pattern which provides transmit beam pattern areas having a concentrated signal strength or gain. The dual element antenna directs the signal into predetermined quadrants or hemispheres to allow for large changes in orientation relative to the base station while minimizing signal loss.

Yet another type of antenna is a scanning directional antenna that employs at least one central active antenna element and multiple passive antenna elements. By changing impedance settings between the passive antenna elements and a ground plane, a beam produced by the directional antenna can be scanned in a fixed number of directions related to the number of passive antenna elements. An example of such a directional antenna is described in U.S. Pat. No. 5,767,807 by Pritchett.

SUMMARY OF THE INVENTION

To determine the direction to set the scan angle of a directional antenna, a controller typically measures the signal-to-noise ratio of a signal, such as a pilot signal, that has a known, constant power output from a base station. The measurement of the pilot signal takes place during idle times—times in which there are no data communications occurring between a field unit and base station. Based on the measurement, a selection of a new scan angle can be made to maximize antenna gain toward a radio tower associated with the same or different base station. An example of such a selection technique is discussed in co-pending U.S. patent application Ser. No. 09/859,001 by Gothard et al., filed May 16, 2001, entitled "Adaptive Antenna for Use in Wireless Communication System."

A problem with taking measurements for selecting scan angles during idle times occurs when the field unit employing a directional antenna is used in a vehicle traveling at a relatively high rate of speed. In such a case, the "best" scan angle changes while the field unit is "in use," thereby causing loss of signal strength between the field unit and base station. The problem may be more noticeable in the case of a field unit, such as a cellular telephone equipped with a directional antenna, being used by an individual who simply "spins" with the phone, such as at a rate of 60 degrees per second. In this case, the gain provided by the directional antenna quickly diminishes due to pointing error, and signal degradation or drop-out may be experienced by the field unit.

To improve performance of field units equipped with directional antennas in a rapidly changing environment, it would be advantageous if a re-scan (i.e., selection of a new scan angle) could occur during non-idle times and at a high enough rate to minimize signal degradation effects caused by the rapidly changing environment (e.g., the user's spinning).

Accordingly, the principles of the present invention include making measurements to use in the adaptation of a directional antenna. A system employing the present invention causes a scan angle of the directional antenna to change temporarily from a current scan angle to at least one trial scan angle during reception of predetermined portions of an information carrying signal. At the trial scan angle(s), a trial metric associated with each trial scan angle is determined by the system. The system then selects a next scan angle based on the trial metrics. Examples of predetermined portions of the information carrying signal include the Power Control Bit (PCB) and small portions of a Forward Error Correction (FEC) block.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is a screen shot illustrating simultaneous parameters for the simulation of FIG. 3;

FIG. 6 is a trace showing why a majority selection algorithm is useful for the field units of FIGS. 1A and 1B;

DETAILED DESCRIPTION OF THE INVENTION

A description of preferred embodiments of the invention follows. A description of preferred embodiments of the invention follows.

Figure 1A:
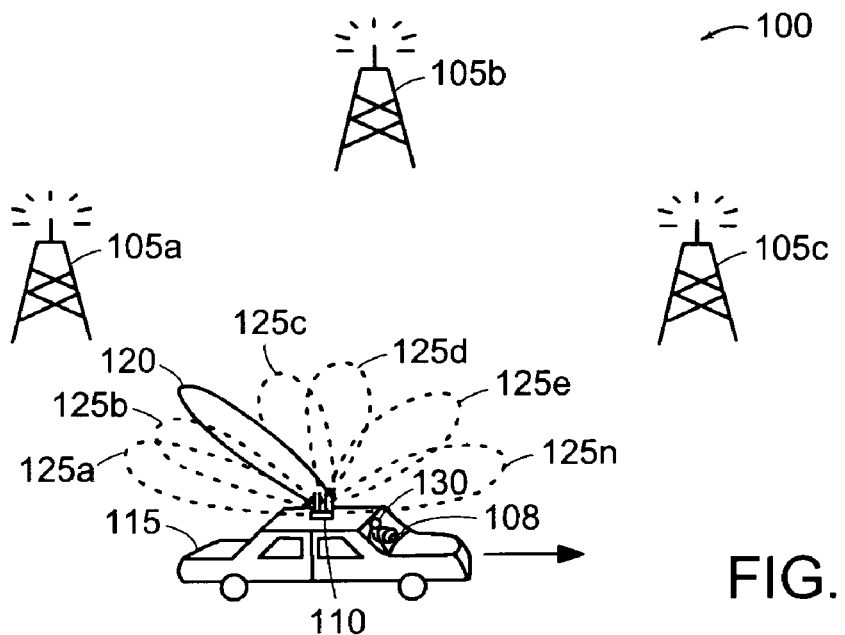
FIG. 1A is a diagram of a vehicle equipped with a field unit operating with a directional antenna according to the principles of the present invention.

FIG. 1 is a diagram of a wireless communications network 100 in which the present invention may be employed. The network 100 may be a Code Division Multiple Access (CDMA), Time Division Multiple Access (TDMA), Time Division Duplex (TDD), Frequency Division Duplex (FDD), WiFi, Wireless Local Area Network (WLAN), or other wireless network. The network 100 includes base stations 105a, 105b, 105c (collectively 105) and wireless communications field unit 108 having a directional antenna 110, such as described in U.S. Pat. No. 6,515,635 by Chiang et al. issued Feb. 4, 2003 or U.S. patent application Ser. No. 09/859,001 by Gothard et al., filed May 16, 2001 entitled "Adaptive Antenna for Use in Wireless Communication System," and technique for optimizing the use of the directional antenna 110, such as described in U.S. patent application Ser. No. 09/776,396 by Proctor, Jr. et al., filed Feb. 2, 2001, entitled "Method and Apparatus for Performing Directional Re-Scan of an Adaptive Antenna." The entire teachings of the patent and patent applications are incorporated herein by reference.

The field unit 108 may be stationary or used in a moving vehicle 115. The field unit 108 may have a current scan angle 120, shown in a solid line, directed to maximize antenna gain for communication with a first base station 105a. The field unit 108 may cause its antenna 112 to change temporarily from its current scan angle 120 to at least one trial scan angle 125a, 125b, 125c, . . . , 125N. During each of these trial scan angles 125, the field unit 108 determines a metric associated with each of the trial scan angles 125. Based on the metrics, the field unit 108 may cause the scan angle to change from the current scan angle 120 to one of the trial scan angles 125 so as to maintain a high signal-to-noise ratio (SNR) or other metric in a forward or reverse path. This process may be referred to as a re-scan.

Unlike the teachings of the prior art in which re-scan occurs during idle times (i.e., no data traffic is being communicated between a base station 105 and the field unit 108), the teachings of the present invention allows a re-scan to occur during non-idle times, where scanning during non-idle times occurs during reception of predetermined portions of an information carrying signal. Typically, in an IS-95 network, for example, the predetermined portion is during a Power Control Bit (PCB) or a small number of symbols of a Forward Error Correction (FEC) code block, but may be any time during an information carrying signal that has substantially little effect on the transfer of information in the information carrying signal.

A benefit of performing a re-scan during non-idle times is to compensate scan angle during use so as to maintain a high signal-to-noise ratio (SNR), or other signal metric so as to minimize signal loss. Minimizing signal loss ensures proper data transfer in data transmission or voice quality in voice transmission systems. By re-scanning during non-idle times, the field unit 108 can rapidly adjust to a rapidly changing environment, such as the vehicle's rapid motion on a highway or around a curve, for example.

Figure 1B:
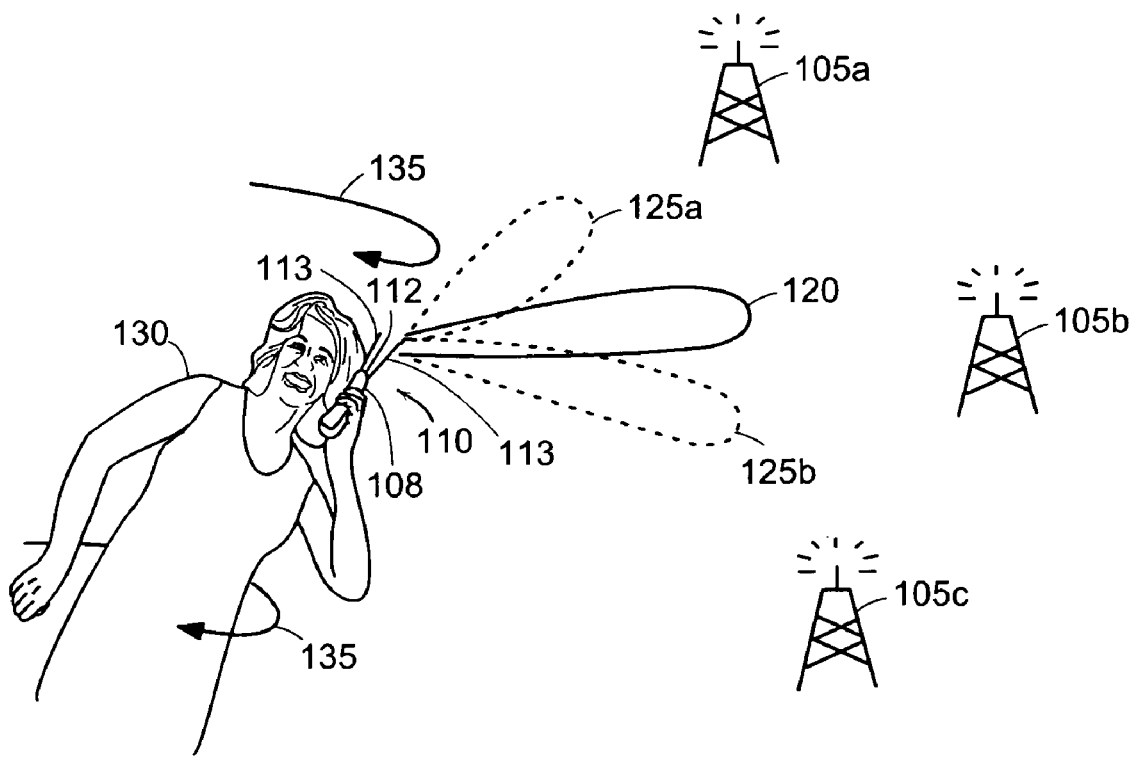
FIG. 1B is a diagram of an end user with a handset also utilizing the principles of the present invention.

FIG. 1B is another environment in which a field unit 108, equipped with a directional antenna 110, capable of performing a re-scan during non-idle times is useful. In this application, an end user 130 may be communicating with another person via wireless communications through the use of the field unit 108 (e.g., cell phone). The end user 130 may be quite animated while participating in the conversation. This level of animation may manifest itself in rotation, indicated by a pair of arrows 135, by the end user 130 during the conversation. The rotation results in the current scan angle 120 no longer pointing directly at one of the base stations 105.

In this case, it is advantageous to have a re-scan process occur during the conversion in a manner such that the end user 130 does not experience a loss of voice quality heard through or transmitted by the field unit 108. Thus, the current scan angle 120 may be constantly tested by being temporarily changed during reception of predetermined portions of a voice signal being received or transmitted by the field unit 108 to test for a better scan angle, but in a manner such that there is substantially no loss of voice quality experienced by the end user 130. In this case, the current scan angle 120 may be temporarily changed to a trial scan angle 125a or 125b, or both trial scan angles 125a, 125b may be tested, and one of these trial scan angles 125a, 125b may be selected to be the next current scan angle. It should be understood that if the end user 130 rotates continuously, the current scan angle 120 may also be changed continuously and, depending on how quickly the end user 130 rotates, the re-scanning process may be employed very frequently to compensate commensurately.

During the re-scan process, the dwell time for the measurement of the trial scan angles 125 is much smaller than a data frame, where the data frame may include a Forward Error Correction (FEC) block. The re-scanning process is said to be performed by "puncturing" some number of symbols of the FEC block, where either a known time is predetermined when no data is present, such as during the Power Control Bit (PCB), or the FEC code is utilized to recover any data lost due to the puncturing through use of error correction. Alternatively, the predetermined portion may be less than the duration of a single power control command generation period.

The present invention may conditionally utilize a non-data symbol in the block of a CDMA forward link signal to perform re-scan. In this case, it may be applied to a W-CDMA, IS-95, or cdma2000 system, where forward power control commands are "punctured" into the data stream to control the transmit (TX) power of the reverse link. The conditions under which the power control bit may be used for rescan can depend on the velocity of the field unit determined by measured parameters of the Radio Frequency (RF) receive channel.

In the case where the field unit 108 travels at a high velocity (e.g., in the vehicle 115 of FIG. 1A), the power control of the field unit 108 becomes ineffective, since the power control update rate is not sufficient to track the rate at which the environment is changing with respect to power control. One way to determine the rate at which the environment is changing is discussed in co-pending U.S. application Ser. No. 09/772,176, filed Jan. 29, 2001, entitled "Method and Apparatus for Detecting Rapid Changes in a Signaling Path Environment," the entire teachings of which are incorporated herein by reference. In those teachings, for example, one technique for determining rapid changes in signaling environment is through analysis of the variance of the received pilot signal level at the output of a baseband demodulator (not shown) inside the field unit 108.

The predetermined portion, during which trial scan metrics are determined, is selected to minimize degradation of the information carrying signal. This means that if the information carrying signal includes voice, the end user 130 should experience substantially no degradation in voice quality. And, if the information is data, there should be substantially no loss of data, optionally measured as a function of Bit Error Rate (BER).

The predetermined portion of the information carrying signal during which the field unit 108 temporarily changes the scan angle of the directional antenna 110 may be during at least one of the following: reception of the Power Control Bit (PCB), low information transfer, receipt of one or more forward error correction (FEC) bits in an FEC block, a time when no time slot has been assigned to the field unit 108, or a time when no payload has been assigned.

The trial metric determined during each trial scan angle 125 may be a function of at least one of the following: the pilot signal of a forward link of a CDMA system, parameters of a control channel, parameters of an assigned payload channel, or parameters of any forward link channel.

A processor (not shown) in the field unit 108 may determine the metrics of the trial scan angle. The processor may also determine a metric associated with the current scan angle 120 of the directional antenna 110 and select a next scan angle by comparing a subset of the trial metrics with the metric of the current scan angle.

Alternatively, the processor may determine metrics for multiple trial scan angles 125 are measured to determine whether to change the next scan angle based on the multiple trial metrics or adaptation rate (i.e., amount of filtering applied to a sequence of metrics for a trial scan angle). Examples of calculations that may be employed for handling multiple trial metrics include averaging or accumulating the multiple trial metrics. This means that measurements at each trial scan angle 125 are repeated so that the processor may accumulate trial metrics associated with each of the trial scan angles 125 or may average each of these trial metrics. In this multiple measurements case, the frequency at which the current scan angle 120 is changed to trial scan angles 125 occurs at a high frequency, especially if trying to maintain a high signal-to-noise ratio for a rapidly changing environment, such as when the end user 130 rotates with the field unit 108, as depicted in FIG. 1B.

The field unit 108 may utilize information from the forward link to determine the quality of the current scan angle 120 in a Time Division Duplex (TDD) system. In both a TDD system and Frequency Division Duplex (FDD) system, the field unit 108 may transmit a signal at each trial scan angle 125, or subset thereof, and receive a metric from a base station 105 corresponding to the respective trial scan angles 125. In a TDD system, the field unit 108 may receive metrics from the base stations 105 for selecting a next scan angle in a reverse path or, because TDD systems use the same frequency for forward and reverse links, the field unit 108 may use metrics from either the forward path or reverse path to determine a best next scan angle.

In FDD systems, however, the forward link signals and reverse link signals use different carrier frequencies, so metrics for each path are preferably determined independently since refraction and multi-path angles for the forward and reverse paths may differ.

Thus, when used in a TDD system, the field unit 108 may transmit a signal to a base station 105 at each trial scan angle 125 to glean information about the forward and reverse paths. In response to the reverse path transmission, the base station 105 calculates a trial metric as a function of the received signal. The base station 105 then transmits the corresponding trial metric to the field unit 108. The field unit 108 uses the trial metric to select a next scan angle for either the forward or reverse path.

The field unit 108 may also determine a received channel parameter, such as power level, and change a trial scan parameter associated with the trial scan angles 125 based on the received channel parameter. For instance, the trial scan parameter that may be changed may include the scanning rate (i.e., period or rate at which trial scan angles 125 occur while attempting to change the current scan angle 120) or adaptation rate (i.e., amount of filtering applied to a sequence of metrics for a trial scan angle 125). It should be noted that the set of trial scan angles 125 may include the current scan angle 120 as a trial scan angle 125 during the re-scan process in order to produce a comparable metric.

The received channel parameters may also include at least one of the following: a signal quality metric, received signal strength metric, signal-to-noise ratio (SNR), energy of a chip versus the total interference (Ec/Io), energy per bit versus the total noise (Eb/No), variance in signal power, change in pilot phase, or statistical measure of any one or combination of the above. Additionally, the received channel parameter may be an automatic gain control (AGC) level crossing rate or variance. Still further, the received channel parameter may be based on pilot channel received parameters, including at least one of the following: level crossing rate of an envelope of a correlated pilot signal, variance of the envelope of the correlated pilot signal, statistical function of the envelope of the correlated pilot signal, slew rate of the code phase of the pilot signal, phase of the pilot signal, variance of the pilot signal, or rate of change of the pilot signal.

The field unit 108 may also detect when direction selection is non-beneficial. In such a case, the field unit 108 may cause the adaptive antenna 110 to operate in an omni-directional mode. In such a case, for a directional antenna having an active antenna element surrounded by a ring of passive antenna elements, each of the passive antenna elements is set to transmissive mode to form an omni-directional antenna pattern.

It should be understood that the principles of the present invention are not limited to a field unit 108 and may be used in base stations 105 or, in a wireless local area network (WLAN), used in an access terminal (AT).

Figure 1C:
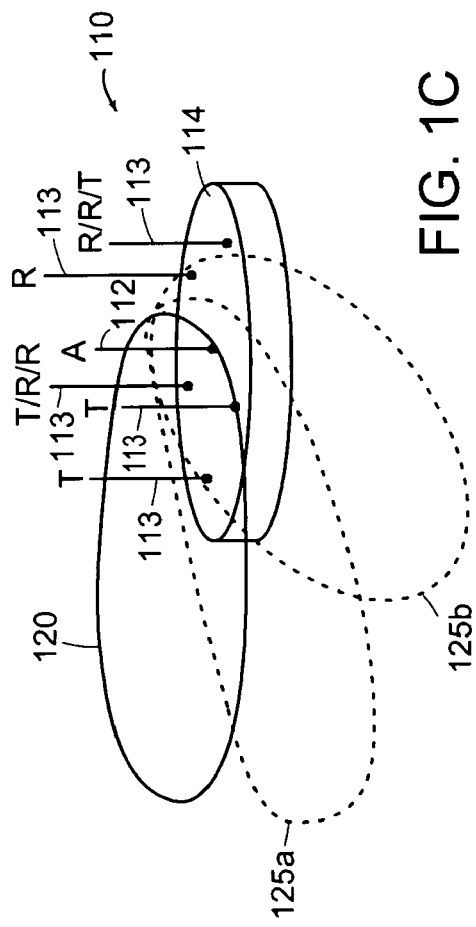
FIG. 1C is a diagram of the directional antenna of FIGS. 1A and 1B and associated antenna beams.

FIG. 1C is an example of the directional antenna 110 that may be used with the field unit 108 to provide high gain antenna beam with steering capability. The directional antenna 110 includes, in this embodiment, and active antenna element 112 and passive antenna elements 113. The passive antenna elements 113 may be used in a transmissive mode or reflective mode. The field unit 108 sets these modes by proper selection of the coupling, capacitive or inductive, respectively, between the passive antenna element 113 and ground plane 114. This may be done through the use of a simple relay (not shown) that couples either a capacitor or inductor to the passive antenna element 113 and the ground plane 114. Other coupling techniques may also be employed, such as those taught in U.S. application Ser. No. 09/859,001 (full citation above).

Continuing to refer to FIG. 1C, in a first configuration, the field unit 108 causes the directional antenna 110 to direct the current scan angle 120 in a first direction. To generate this scan angle, three passive antenna elements 113 are set-up as transmissive, as represented by the letter "T" above these passive antenna elements 113, and two of the passive antenna elements 113 are set-up as reflective, as represented by the letter "R" above these passive antenna elements 113.

During reception of a first predetermined portion (e.g., Power Control Bit) of an information carrying signal, one of the transmissive passive antenna elements 113 changes from being transmissive to being reflective, represented by the "R" above the passive antenna element 113 in the second position of the string "T/R/R". Changing this passive antenna element 113 to being reflective causes the scan angle to switch from the current scan angle 120 to a first trial scan angle 125a. At some later time, during reception of a second predetermined portion of an information carrying signal, the directional antenna 110 changes the scan angle from the current scan angle 120 to a second trial scan angle 125b. This second scan angle 125b is generated by having the front right passive antenna element 113 change from reflective mode to transmissive mode, as indicated by the "T" in the third position in the string "R/R/T" while the back left passive antenna element 113 remains in reflective mode, as indicated by the "R" in the third position of the string "T/R/R".

Figure 7:
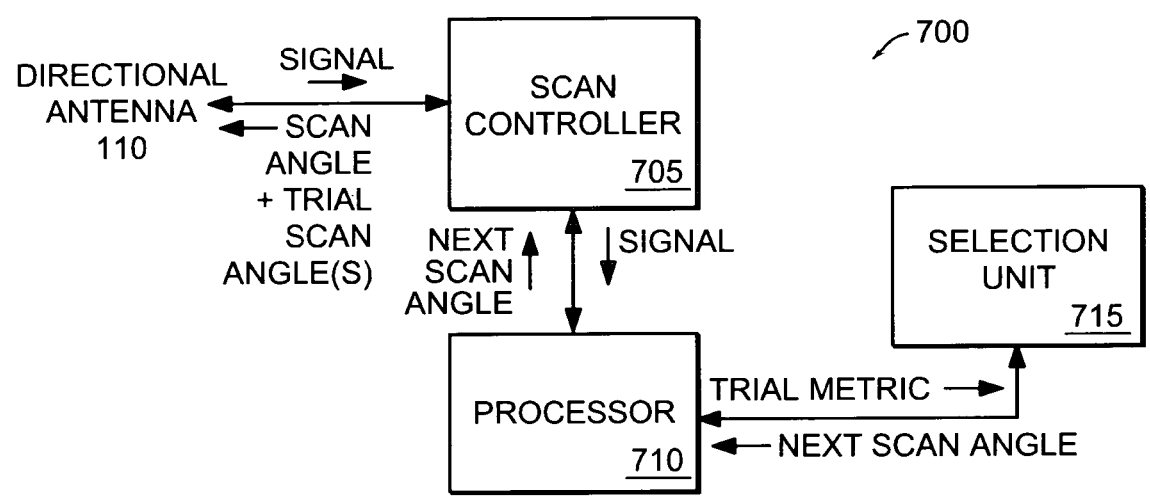
FIG. 7 is a block diagram of an example circuit that may be employed by the field unit of FIGS. 1A and 1B.

FIG. 7 is a block diagram of an example circuit 700 that may be employed by the field unit to perform the re-scan function discussed above. The circuit 700 includes a scan controller 705, a processor 710, and a selection unit 715. The scan controller 705 may be coupled to the directional antenna 110, either directly or via other circuitry (not shown) to cause a scan angle of the directional antenna 110 to change temporarily from a current scan angle 120 to at least one trial scan angle 125 during reception of a predetermined portion of an information carrying signal. The scan controller 705 may also receive a signal, such as a communication or pilot signal, from the directional antenna 110. The signal may be an RF, intermediate, or baseband signal that may have been processed by other circuitry (not shown) that is capable of converting the signal to a form (e.g., digital) capable of being processed by the scan controller 705 and/or processor 710 and selection unit 715.

The processor 710 is coupled to the scan controller 705 to determine a trial metric associated with each trial scan angle 125. The selection unit is coupled to the processor to select a next scan angle based on the trial scan angle metrics.

It should be understood that the block diagram is merely an example architecture that may be used to support the re-scan process. Alternative arrangements may be used. For example, the scan controller 705, processor 710, and selection unit 715 may be interconnected in different ways, implemented in a single processor (e.g., Digital Signal Processor (DSP)) in software, or hard-wired in a Field Programmable Gate Array (FPGA). Additional circuitry (not shown), including memory, logic, and other basic circuit elements may also be included in the circuitry 700. Additional signals may also be passed among the circuit components 705, 710, 715, and various formats of the signals may be used, such as analog or digital formats. If implemented in software, the software code may be stored on digital or optical media and executed by one or more processors to cause the processor(s) to execute the re-scan functions discussed above.

Figure 2A:
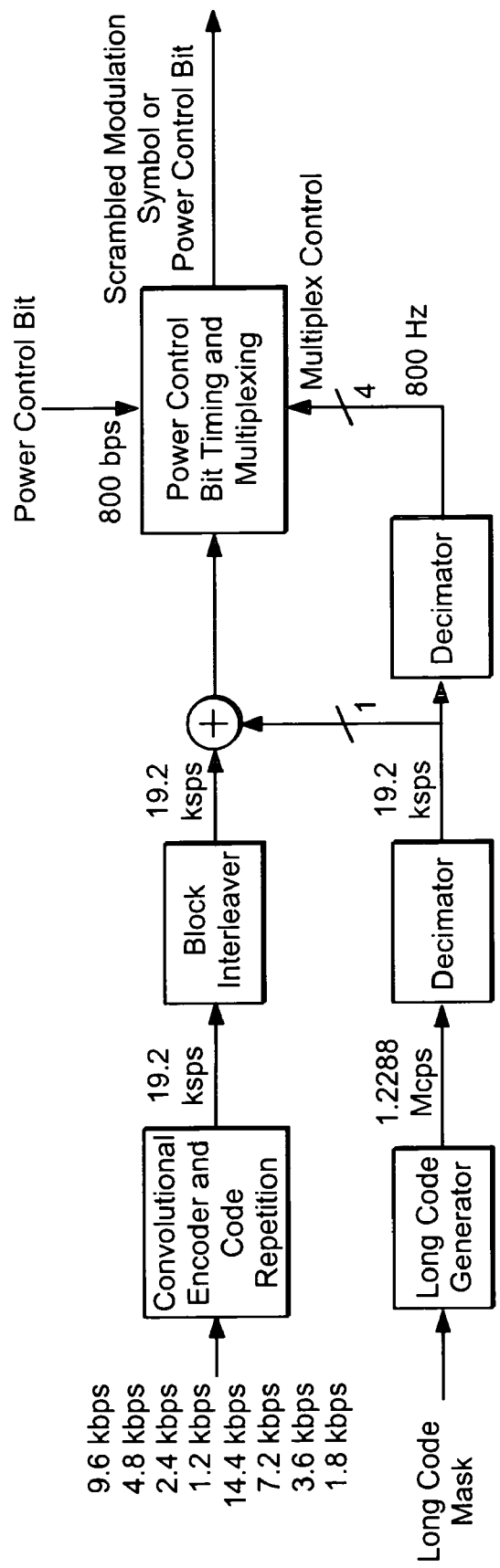
FIG. 2A is a block diagram of a circuit used in the field unit of FIGS. 1A or 1B that inserts a Power Control Bit (PCB) into a symbol in an IS-95 wireless communications system.

FIG. 2A is a block diagram of a circuit used in an IS-95B communications system to insert Power Control Bits (PCBs) into information frames every 1.25 msec (800 Hz). Lower data rates are achieved by repeating the FEC block a number of times; the symbol modulation rate is always 19.2 kHz (approximately 52 microseconds per symbol) giving 24 symbols every 1.25 msec, as shown in FIG. 2B.

This circuit is not part of the present invention, but is useful in understanding how the PCB is multiplexed into an information signal. The field unit 108 knows the location of the PCB and, through use of the principles of the present invention, takes advantage of the knowledge of the location of the PCB to determine metrics at trial scan angles 125 to determine whether the current scan angle 120 provides better performance than the trial scan angles 125.

Figure 2B:
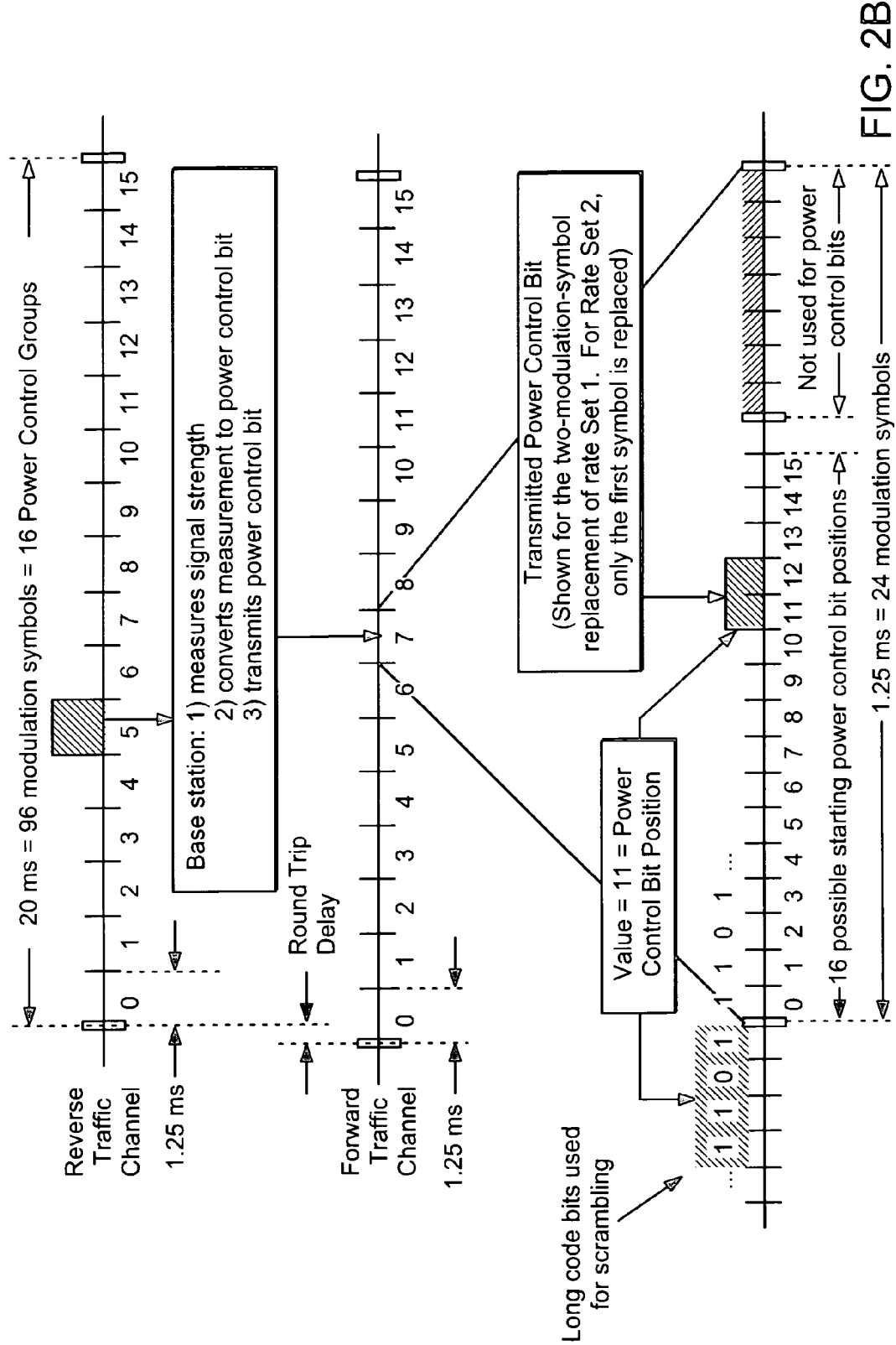
FIG. 2B is a timing diagram indicating locations of the Power Control Bit in the symbol produced by the circuit of FIG. 2A.

FIG. 2B is a timing diagram in the IS-95B standard. Based on the reverse traffic channel in the fifth power control group, a base station 105 measures the signal strength of a reverse traffic channel, converts the measurement to a PCB, and transmits the PCB. In the forward traffic channel in the seventh power control group, the PCB is transmitted in symbols 11 and 12, as indicated by the long code bits to the left of the zero'th symbol position. In an alternative setting, the PCB may be transmitted in a single symbol. The field unit 108 may take advantage of the puncturing times and duration to make trial scan measurements for one or more of the trial scan angles 125. These trial scan measurements may use the full duration of the PCB or be less than a single symbol during which the PCB is transmitted.

Figure 2C:
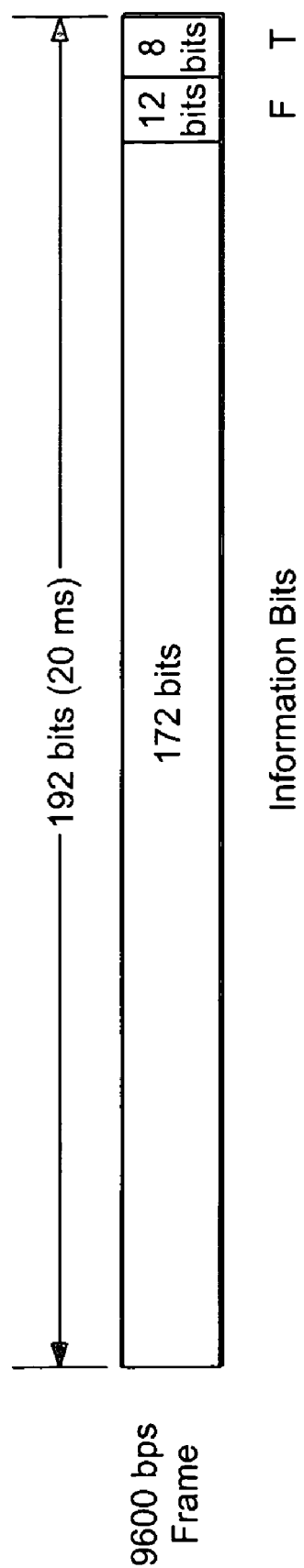
FIG. 2C is a frame diagram indicating information bits contained in an FEC block for the encoded symbols of FIG. 2B.

The FEC blocks in FIG. 2C are rate ½ encoded and interleaved. These FEC blocks may also be "punctured" randomly by inserting the PCBs in place of the encoded symbols. For example, the 9600 bps frame is encoded giving 384 encoded symbols every 20 msec, giving 24 symbols every 1.25 msec (i.e., 16×24=384). From FIG. 2B, IS-95B "punctures" two symbols every 24 symbols to insert the PCB. Since loss of some FEC bits is correctable by the FEC decoding algorithm, the FEC block also offers an opportunity to test trial scan angles 125 for improved performance over the current scan angle 120.

For an adaptive antenna with N predefined antenna patterns, a method of scanning the array may be as follows. First, a metric of the current scan angle 120 is measured. Next, the scan angle is re-pointed and a second measurement (i.e., trial scan angle 125) is made. The two positions are then compared and the better is selected. The comparison may be based on one set of measurements or M sets prior to the decision to retain or re-point the directional antenna 110 is made. Next, the selected scan angle is re-measured and compared with another trial scan angle of the M total scan angles. The differential measurements may be made continuously, optionally incrementally comparing all trial scan angles 125 with a best current scan angle 120.

This may be done for a 3-position antenna as shown in Table 1.

TABLE 1

| Time period | Current Scan Angle | Trial Scan Angle | Next Scan Angle |
|---|---|---|---|
| A - Change | Omni | Left | Left |
| B - No Change | Left | Right | Left |
| C - No Change | Left | Omni | Left |
| D - No Change | Left | Right | Right |
| E - Change | Right | Omni | Right |
| F - No Change | Right | Left | Right |

This may additionally be performed for the transmitter from the field unit 108 utilizing the directional antenna to transmit. In this case, feedback from the Base Transceiver Station (BTS) over the forward link is required when used in a Frequency Division Duplex (FDD) mode. For Time Division Duplex (TDD) systems, no feedback is required, but may be used.

Discussed below is a simulation program that allows exploration of the relationships between puncturing frequency (i.e., the cycles stolen from the normal power control to make measurements on a new directional antenna scan angle), the speed of the field unit 108, the optimal number of samples required to make a steering decision, and the degrees per second at which the field unit 108 is allowed to rotate without suffering significant signal degradation.

Figure 3:
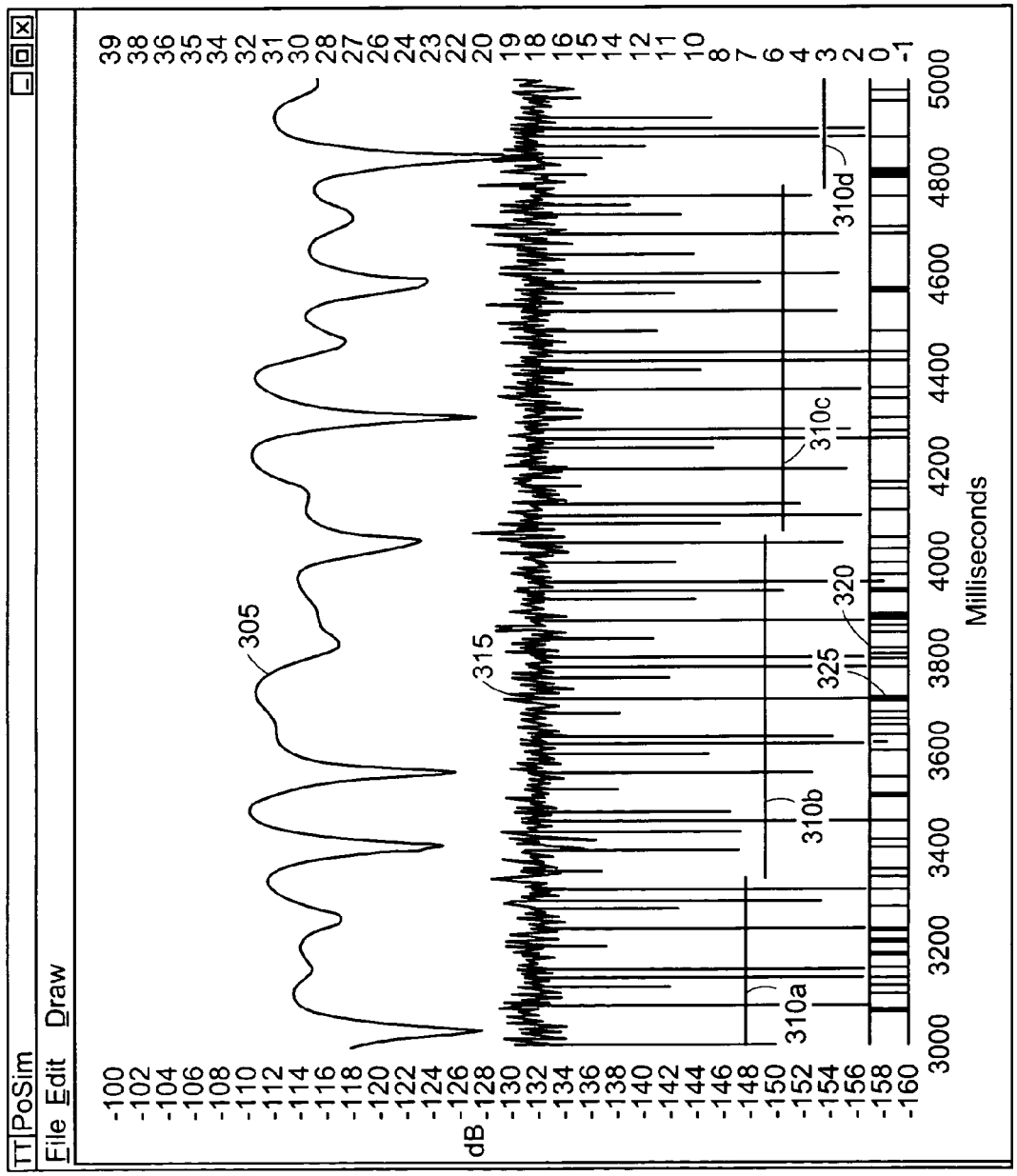
FIG. 3 illustrates signal strength and antenna control signals in the field unit of FIGS. 1A and 1B.

FIG. 3 is a chart of signal strength 305 (Jakes model on the top graph) fluctuating for a user moving at 3 miles per hour. The chart represents 2 seconds of time.

The lower mostly horizontal lines 310a, 310b, 310c, 310d each represent one of the ten antenna positions (reading on the right hand scale). The directional antenna 110 compensates a rotation of the field unit 108 of 60 degrees per second in this example.

The curve 315 in the middle represents the power-corrected signal. Every 16 milliseconds (the puncturing cycle), it is possible to see that the directional antenna 110 was rotated to a sub-optimal position, and, consequently, the signal level dropped. This had no effect on the data stream since the position was not selected.

The above simulation also shows a curve 320 (in black at the bottom), which represents +/− power normal control bits (at 800 Hz). The black vertical lines 325 in this curve 320 indicate control bits received in error due to selection of a sub-optimal trial scan angle.

The scanner shot of FIG. 4 shows some of the parameters and the possibilities of the simulation program.

As an example, a user may select a Cumulative Distribution Function of the (SNR-TARGET_SNR) with a variety of rotational speeds for the field unit 108. Other exemplary selectable parameters in the GUI window for operating the simulation are also shown.

Figure 5:
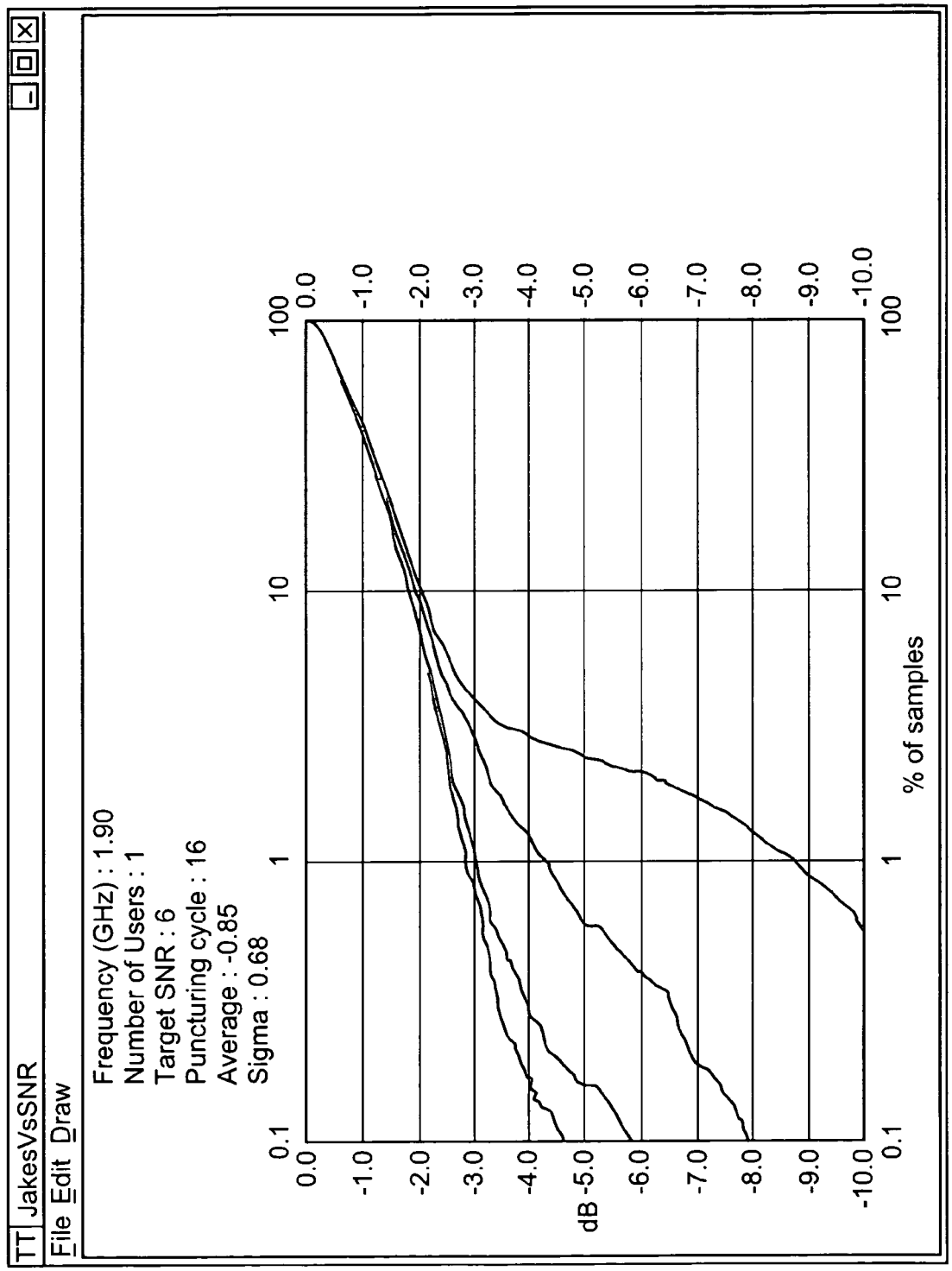
FIG. 5 is a graph that illustrates how different rotational speeds of the field unit of FIGS. 1A and 1B affect the percentage of signal dropouts.

The curves of FIG. 5 represent rotations of 0 (top curve), 30 (second), 60 (third) and 90 (bottom curve) degrees per second, respectively, for the field unit 108, such as in the rapidly changing signaling environment of FIG. 1B. Referring to FIG. 5, if the field unit 108 rotates at 0 degs/sec, less than 1% of the time the received signal strength degrades by more than −3 dB. By comparison, for a rotation of 60 degs/sec, less than 9% of the time, the received signal strength degrades by more than −4 dB; and for a rotation of 90 degs/sec, less than 1% of the time, the received signal strength degrades by more than−9 dB.

Figure 6:
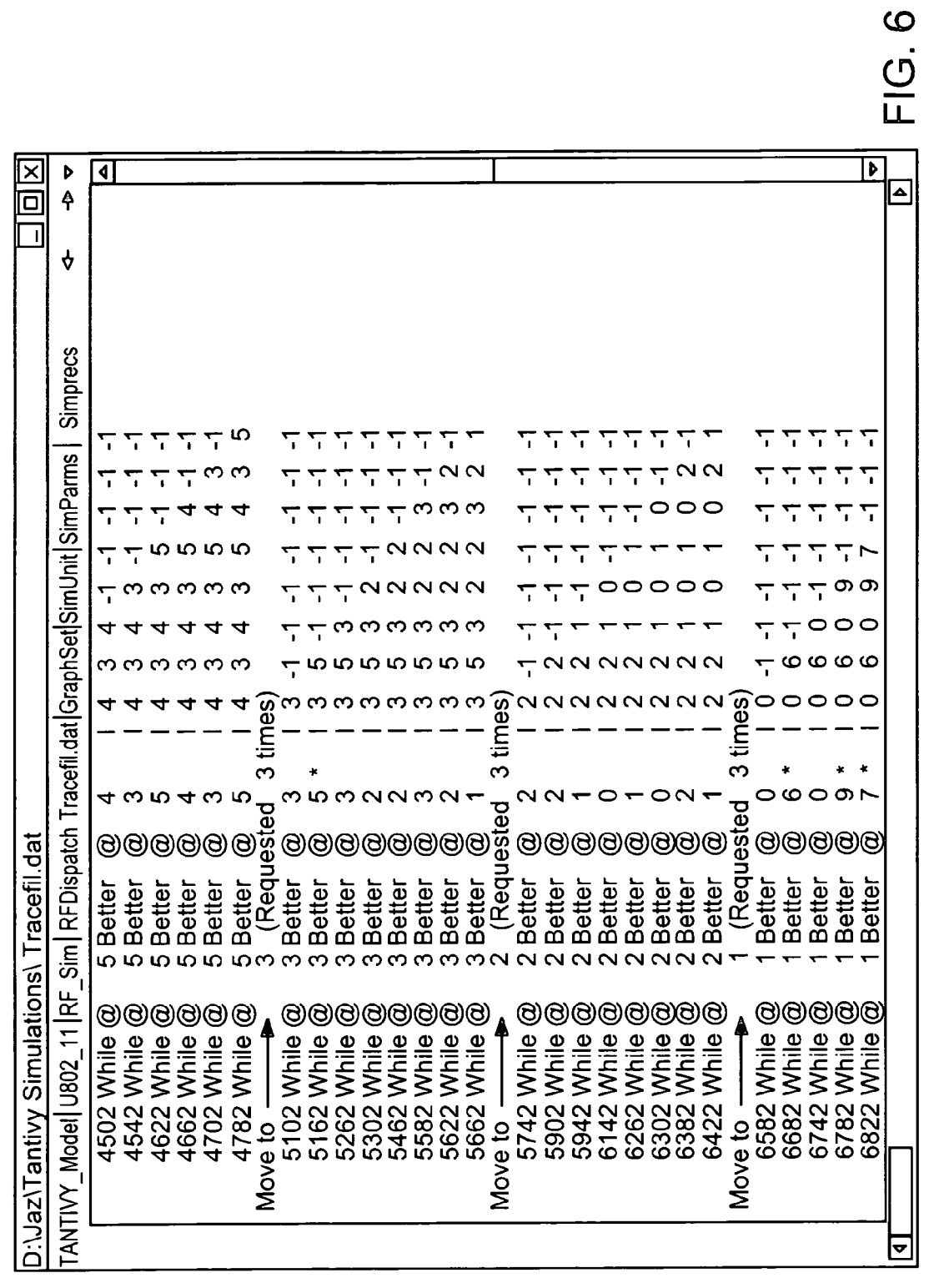

FIG. 6 is a trace showing why a majority-selection algorithm or other suitable averaging algorithm may be useful for antenna scan selection. Because of many errors in power assessments, the antenna scan angle may be updated frequently to compensate for a rapidly changing environment.

In the trace, while the directional antenna 110 is set to current scan angle 120 number "3", trial scan angles 125 are tested for signal strength comparison. As indicated, the following trial scan angles 125 were found to be better than scan angle #3: "3 5 3 2 2 3 2 1". Based on these results, scan angle #2 is selected as the next scan angle since it was selected three out of eight times as the best scan angle according to a given metric, such as SNR. The next trace results in the scan angle being changed to scan angle #1 for similar reasons.

The rate and period of the re-scan may be changed based on the determined link stability or velocity. For instance, at moderate speeds, the scan may be performed once every other FEC frame or ⅟32 of the power control bits. For high velocity, it may be performed at a higher rate (e.g., every other power control bit). The velocity of the vehicle 115 (FIG. 1) may be determined as described in U.S. patent application Ser. No. 09/772,176 (full citation above). Examples of this include Automatic Gain Control (AGC) variation, Doppler, and level crossing rate of the correlated pilot signal.

In using the Level Crossing Rate of AGC signal to measure mobile velocity, the AGC output signal may be corrupted by Additive White Gaussian Noise (AWGN). Therefore, the AGC Level Crossing Rate does not represent Rayleigh fading fluctuation well. Instead of AGC Level Crossing Rate, a more preferable method may be to use the Level Crossing Rate of Pilot signal envelope ($\sqrt{I^2+Q^2}$) which comes from an Field Unit baseband demodulator (not shown). The Pilot signal envelope represents the Rayleigh fading variation well and it is less affected by AWGN.

If variance is the measured metric instead of AGC, the continuous forward link Pilot signal variance is more proportional to the fading variation.

Further, there may be conditions when these parameters indicate that no directional position is likely to be beneficial and scanning may be halted. In this case, the directional antenna 110 may be steered omni-directional.

Additionally, when the power control is effective at slow or medium velocities or channel variations, it may be useful to scan the directional antenna 110 at a rate that is faster than the forward power control loop can respond to adjust the TX power significantly. Scanning at a rate that is relatively slow may cause excess jitter in the forward power control loop as the commands response to the scanning process rather than the channel.

The principles of the present invention additionally includes the concept of scanning with a dwell time that minimizes the impact to the forward control loop. For instance, in practice, a Power Control Bit (PCB) is generated based on a measurement duration of 1.25 ms. The PCB is transmitted at this period as well, but over a significantly shorter period of time (e.g., 1 symbol or 64 chips). Each PCB typically adjusts the power by 1 dB. If the dwell time of the scan is N * 1.25 ms periods long (power control groups), a measurement of a trial scan angle 125 has the potential of modifying the forward power significantly. If the trial scan angle 125 is limited to one or less power control group (PCG), the impact of a bad position in minimized. Further, if the re-scan trial scan angle 125 is a fraction of the PCG period, the impact to the power control loop is further minimized. Since the PCB itself is only a fraction of the PCG, scanning during the PCB time lessens any forward power control impact from the scanning process.

Figure 8A:
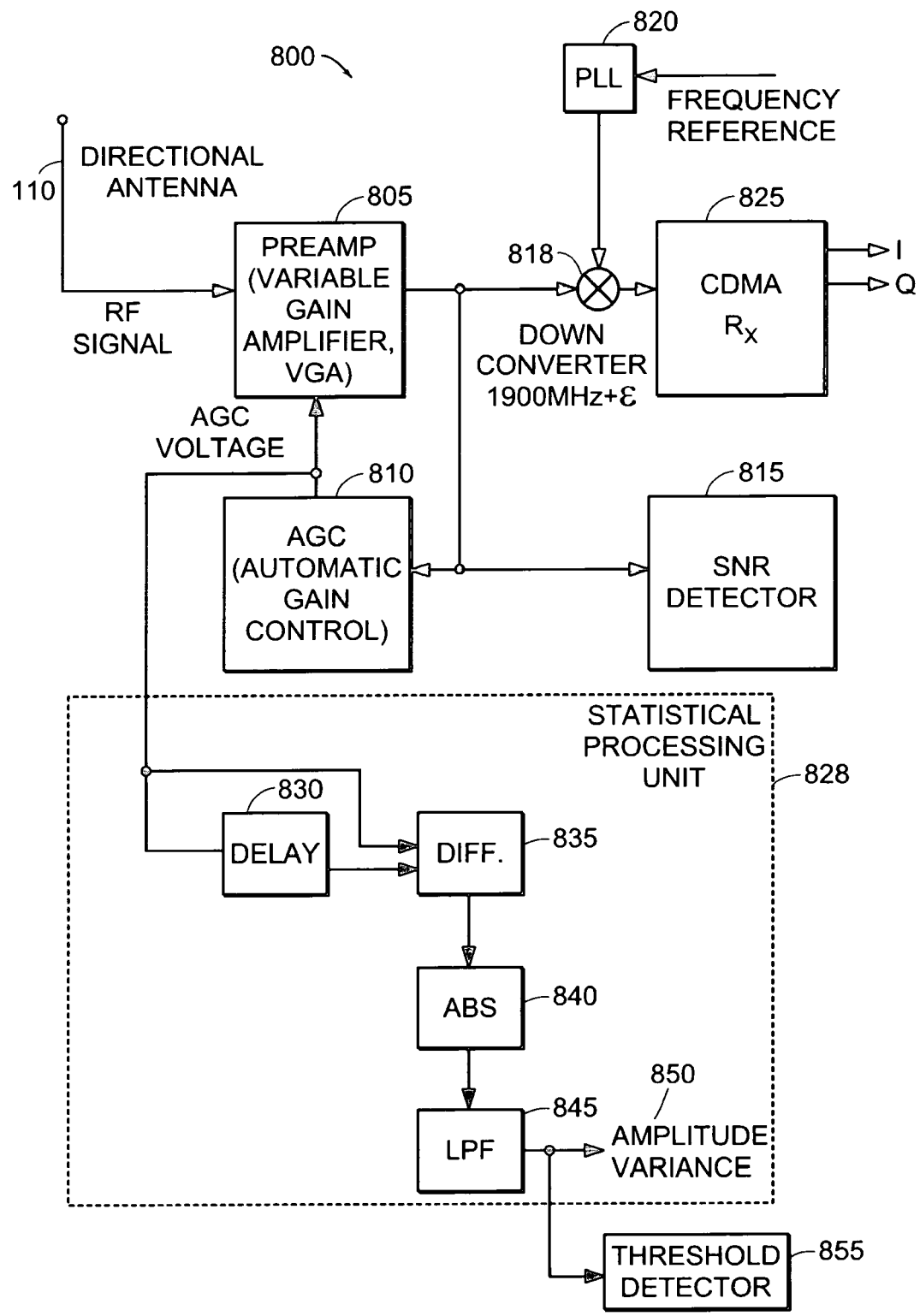
FIG. 8A is a block diagram of an example receiver for the field units of FIGS. 1A and 1B in which an AGC module signal output is used to determine a metric for sensing rapid changes in the amplitude of a communications signal traveling on a signaling path of a communications link.

FIG. 8A is a block diagram of an exemplary receiver circuit 800 in a wireless modem in, for example, a field unit 108 or base station 105 that may be used to detect rapid changes in signaling environment. In the case of a field unit 108, the field unit 108 includes the directional antenna 110 to receive an RF signal over a wireless communications link across a signaling path from the directional antenna 110 to the base station 105. The RF signal is received by a pre-amplifier 805, which, in this case, is a variable gain amplifier (VGA). The output of the pre-amplifier 805 is sent to a down-converter 818, AGC controller 810, and SNR detector 815.

The down-converter 818 demodulates the output from the pre-amplifier 805 with a signal from a phase locked loop (PLL) controller 820. The down-converter 818 outputs a frequency demodulated signal, thereby providing symbols to a CDMA receiver 825. The CDMA receiver 825 outputs typical in-phase and quadrature (I,Q) signals for further CDMA processing.

The SNR detector 815 calculates the signal-to-noise ratio of the output of the preamplifier 805. The output from the SNR detector 815 may be used, for among other reasons, to detect motion of the field unit 108. However, the results from the SNR detector 815 may not be useful for determining rapid changes in signaling environment because the SNR detector 815 receives the output from the pre-amplifier 805 that has been normalized as a result of the feedback from the AGC 810.

Instead, it may be preferable to use a signal (e.g., AGC voltage) that indicates a rapid change in a modulation attribute, which in this case is amplitude modulation. And, since a rapid change in the modulation attribute typically varies in a manner related to a rapid change in the signaling path, the detection is accurate and repeatable.

Continuing to refer to FIG. 8A, a statistical processing unit 828 uses a difference computational unit 835 to calculate a difference between the AGC voltage and a delayed representation of the AGC voltage, as produced by a delay unit 830. The difference computational unit 835 provides an output to an absolute value computational unit 840, which rectifies the output of the difference computational unit 835. The output from the absolute value computational unit 840 is then processed by a low pass filter (LPF) 845 to produce an amplitude variance 850. The statistical processing unit 828 can also use other techniques not shown but known in the art for calculating the variance.

The amplitude variance 850 may also be compared against a threshold by a threshold detector 855.

Thus, the amplitude variance 850 or result from the threshold detector 805 may be used, for example, to determine that the rate of re-scan should be increased or even that omni-directional mode should be used.

It should be understood that the statistical processing unit 828 can also be employed to provide alternative metrics regarding the amplitude modulation attribute of the signal transmitted across the wireless link.

Figure 8B:
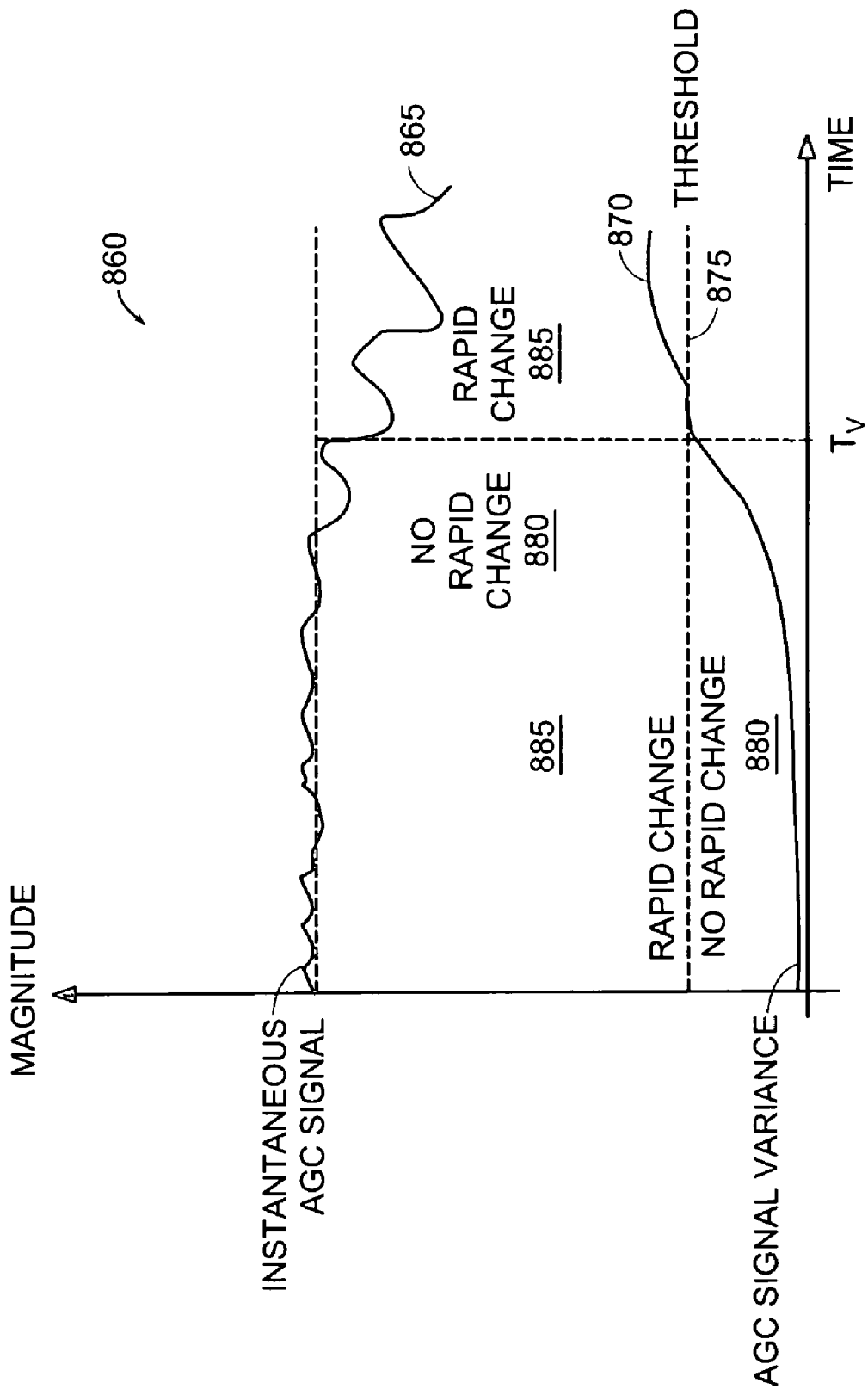
FIG. 8B is a plot of the AGC signal of FIG. 8A.

FIG. 8B is a plot of the instantaneous AGC signal output from the AGC 810 (FIG. 8A). As shown, the instantaneous AGC signal 865 shows no indication of rapid changes in the signaling path between the field unit 108 and the base station 105. However, after time $T_v$, the instantaneous AGC signal 865 shows an indication that rapid changes are taking place between the field unit 108 and the base station 105. Accordingly, a no_rapid_change zone 880 and a rapid_change zone 885 are indicated to show the point at which the instantaneous AGC signal 865 indicates that a rapid change has occurred.

As expected, the AGC signal variance 870 increases as the instantaneous AGC signal 865 shows indications of rapid changes of the signaling path between the field unit 108 and the base station 105. As should be understood, the AGC signal variance 870 corresponds with the amplitude variance 850 computed by the statistical processing unit of FIG. 8A. And, as expected, the AGC signal variance 870 crosses the threshold 875 at time $T_v$, indicating that a rapid change has been detected.

The threshold is predetermined through either standard probability calculations or through empirical measurements and applied here. Similar to the instantaneous AGC signal 865, the AGC signal variance 870 has a no_rapid_change zone 880 and a rapid_change zone 885, below and above the threshold 875, respectively.

Alternative embodiments of the circuit of FIG. 8A for determining rapid changes in signaling environment are described in U.S. patent application Ser. No. 09/772,176 (full citation above).

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for making measurements to use in the adaptation of a directional antenna, the method comprising:
    causing a scan angle of the antenna to change temporarily from a current
    scan angle to at least one trial scan angle during reception of a Power Control Bit (PCB) with a dwell time that minimizes an impact to a forward link power control loop;
    determining a trial metric associated with each trial scan angle; and
    selecting a next scan angle based on the trial metrics.

2. The method according to claim 1 wherein the Power Control Bit with the dwell time that minimizes the impact to the forward link power control loop is selected to minimize degradation of an information carrying signal.

3. The method according to claim 1 wherein the dwell time of the Power Control Bit is less than the duration of a single power control command generation period.

4. The method according to claim 1 wherein the Power Control Bit (PCB) is during at least one of the following:
    reception of the Power Control Bit (PCB);
    low information transfer;
    receipt of one or more Forward Error Correction (FEC) bits in an FEC block;
    a time when no traffic channel is assigned; or
    a time when no payload is assigned.

5. The method according to claim 1 wherein the trial metrics are a function of at least one of the following:

the pilot signal of a forward link of a CDMA system;
parameters of a control channel;
parameters of an assigned traffic channel; or
parameters of any forward link channel.

6. The method according to claim 1 further including determining a current metric associated with a current scan angle of the antenna; and selecting a next scan angle includes comparing a subset of trial metrics with the current metric.

7. The method according to claim 1 further including:
determining multiple trial metrics for the trial scan angles; and
selecting a next scan angle takes the multiple trial metrics into account.

8. The method according to claim 7 further including averaging or accumulating the multiple trial metrics.

9. The method according to claim 1 further including utilizing information from the forward link to determine the quality of the current scan angle for Time Division Duplex (TDD) systems.

10. The method according to claim 1 further including:
transmitting a signal at each trial scan angle and receiving a metric corresponding thereto from a base station; and
using the received metrics for selecting a next scan angle in a reverse path.

11. The method according to claim 10 used in a Frequency Division Duplex (FDD) or Time Division Duplex (TDD) system.

12. The method according to claim 1 used in a TDD system, wherein at each trial scan angle, the method further includes:
transmitting a signal to a base station; and
wherein determining a trial metric includes receiving the trial metric from the base station.

13. The method according to claim 1 further including determining a received channel parameter and changing a trial scan parameter based on the received channel parameter.

14. A method for making measurements to use in the adaptation of a directional antenna, the method comprising:
causing a scan angle of the antenna to change temporarily from a current scan angle to at least one trial scan angle during reception of a predetermined portion of an information carrying signal;
determining a trial metric associated with each trial scan angle;
selecting a next scan angle based on the trial metrics;
determining a received channel parameter and changing a trial scan parameter based on the received channel parameter, the trial scan parameter including a scanning rate or adaptation rate.

15. The method according to claim 13 wherein the received channel parameter includes at least one of the following: pilot quality metric, received signal strength, SNR, Ec/Io, Eb/No, variance in signal power, change in pilot phase, or statistical measure of any one or combination of the above.

16. A method for making measurements to use in the adaptation of a directional antenna, the method comprising:
causing a scan angle of the antenna to change temporarily from a current scan angle to at least one trial scan angle during reception of a predetermined portion of an information carrying signal;
determining a trial metric associated with each trial scan angle;
selecting a next scan angle based on the trial metrics;
determining a received channel parameter and changing a trial scan parameter based on the received channel parameter, the received channel parameter being an Automatic Gain Control (AGC) level crossing rate or variance.

17. A method for making measurements to use in the adaptation of a directional antenna, the method comprising:
causing a scan angle of the antenna to change temporarily from a current scan angle to at least one trial scan angle during reception of a predetermined portion of an information carrying signal;
determining a trial metric associated with each trial scan angle;
selecting a next scan angle based on the trial metrics;
determining a received channel parameter and changing a trial scan parameter based on the received channel parameter, the received channel parameter being based on pilot channel received parameters including at least one of the following: level crossing rate of an envelope of a correlated pilot signal, variance of the envelope of the correlated pilot signal, statistical function of the envelope of the correlated pilot signal, slew rate of the code phase of the pilot signal, phase of the pilot signal, variance of the pilot signal, or rate of change of the pilot signal.

18. A method for making measurements to use in the adaptation of a directional antenna, the method comprising:
causing a scan angle of the antenna to change temporarily from a current scan angle to at least one trial scan angle during reception of a predetermined portion of an information carrying signal;
determining a trial metric associated with each trial scan angle;
selecting a next scan angle based on the trial metrics;
detecting when direction selection is non-beneficial; and
setting the adaptive antenna into an omni-directional mode.

19. The method according to claim 1 used in a field unit, base station, or access terminal.

20. An apparatus for making measurements to use in the adaptation of a directional antenna, the apparatus comprising:
a scan controller to cause a scan angle of the directional antenna to change temporarily from a current scan angle to at least one trial scan angle during reception of a Power Control Bit (PCB) with a dwell time that minimizes an impact to a forward link power control loop;
a processor coupled to the scan controller to determine a trial metric associated with each trial scan angle; and
a selection unit coupled to the processor to select a next scan angle based on the trial metrics.

21. The apparatus according to claim 20 wherein the Power Control Bit (PCB) is selected to minimize degradation of an information carrying signal.

22. The apparatus according to claim 20 wherein the dwell time of the Power Control Bit is less than the duration of a single power control command generation period.

23. The apparatus according to claim 20 wherein the Power Control Bit (PCB) is during at least one of the following:
reception of the Power Control Bit (PCB);
low information transfer;
receipt of one or more Forward Error Correction (FEC) bits in an FEC block;
a time when no traffic channel is assigned; or
a time when no payload is assigned.

24. The apparatus according to claim 20 wherein the metrics are a function of at least one of the following:
the pilot signal of a forward link of a CDMA system;
parameters of a control channel;
parameters of an assigned traffic channel; or
parameters of any forward link channel.

25. The apparatus according to claim 20 wherein the processor determines a current metric associated with a current scan angle of the directional antenna and the selection unit selects a next scan angle by comparing a subset of trial metrics with the current metric.

26. The apparatus according to claim 20 wherein the processor determines multiple trial metrics for the trial scan angles and the selection unit selects a next scan angle by taking the multiple trial metrics into account.

27. The apparatus according to claim 26 wherein the processor includes an arithmetic unit to average or accumulate the multiple trial metrics.

28. The apparatus according to claim 20 wherein the processor uses the selected scan angle to determine the quality of the scan angle for Time Division Duplex (TDD) systems.

29. The apparatus according to claim 20 further including
a transceiver to transmit a signal at each trial angle and receive a metric corresponding thereto from a base station; and
wherein the processor coupled to the transceiver uses the received metrics for selecting a next scan angle in a reverse path.

30. An apparatus according to claim 20 used in a Frequency Division Duplex (FDD) or Time Division Duplex (TDD) system.

31. The apparatus according to claim 20 used in a TDD system, wherein at each trial scan angle, the processor transmits a signal to a base station and responsively receives the trial metric from the base station.

32. The apparatus according to claim 20 wherein the processor receives a channel parameter and changes a trial scan parameter based on the received channel parameter.

33. An apparatus for making measurements to use in the adaptation of a directional antenna, the apparatus comprising:
a scan controller to cause a scan angle of the directional antenna to change temporarily from a current scan angle to at least one trial scan angle during reception of a predetermined portion of an information carrying signal;
a processor coupled to the scan controller to determine a trial metric associated with each trial scan angle; and
a selection unit coupled to the processor to select a next scan angle based on the trial metrics, the processor receiving a channel parameter and changing a trial scan parameter based on the received channel parameter, the trial scan parameter including a scanning rate or adaptation rate.

34. The apparatus according to claim 32 wherein the received channel parameter includes at least one of the following: pilot quality metric, received signal strength, SNR, Ec/Io, Eb/No, variance in signal power, change in pilot phase, or statistical measure of any one or combination of the above.

35. An apparatus for making measurements to use in the adaptation of a directional antenna, the apparatus comprising:
a scan controller to cause a scan angle of the directional antenna to change temporarily from a current scan angle to at least one trial scan angle during reception of a predetermined portion of an information carrying signal;
a processor coupled to the scan controller to determine a trial metric associated with each trial scan angle; and
a selection unit coupled to the processor to select a next scan angle based on the trial metrics, the processor receiving a channel parameter and changing a trial scan parameter based on the received channel parameter, the received channel parameter being an Automatic Gain Control (AGC) level crossing rate or variance.

36. An apparatus for making measurements to use in the adaptation of a directional antenna, the apparatus comprising:
a scan controller to cause a scan angle of the directional antenna to change temporarily from a current scan angle to at least one trial scan angle during reception of a predetermined portion of an information carrying signal;
a processor coupled to the scan controller to determine a trial metric associated with each trial scan angle; and
a selection unit coupled to the processor to select a next scan angle based on the trial metrics, the processor receiving a channel parameter and changing a trial scan parameter based on the received channel parameter, the received channel parameter being based on pilot channel received parameters including at least one of the following: level crossing rate of an envelope of a correlated pilot signal, variance of the envelope of the correlated pilot signal, statistical function of the envelope of the correlated pilot signal, slew rate of the code phase of the pilot signal, phase of the pilot signal, variance of the pilot signal, or rate of change of the pilot signal.

37. An apparatus for making measurements to use in the adaptation of a directional antenna, the apparatus comprising:
a scan controller to cause a scan angle of the directional antenna to change temporarily from a current scan angle to at least one trial scan angle during reception of a predetermined portion of an information carrying signal;
a processor coupled to the scan controller to determine a trial metric associated with each trial scan angle; and
a selection unit coupled to the processor to select a next scan angle based on the trial metrics, the processor receiving a channel parameter and changing a trial scan parameter based on the received channel parameter, the processor is configured to (i) determine when direction selection is non-beneficial and (ii) cause the adaptive antenna to enter into an omni-directional mode.

38. The apparatus according to claim 20 used in a field unit, base station, or access terminal.

39. A method for making measurements to use in the adaptation of a directional antenna, the method comprising:
causing a scan angle of the antenna to change temporarily from the current angle to at least one trial scan angle during reception of a Power Control Bit (PCB) with a dwell time that is a fraction of a power control group period; determining a trial metric associated with each trial scan angle; and selecting a next scan angle based on the trial metrics.

40. An apparatus for making measurements to use in the adaptation of a directional antenna, the apparatus comprising:
a scan controller to cause a scan angle of the antenna to change temporarily from the current angle to at least one trial scan angle during reception of a Power Control Bit (PCB) with a dwell time that is a fraction of a power control group period;

a processor coupled to the scan controller to determine a trial metric associated with each trial scan angle; and a selection unit coupled to the processor to select a next scan angle based on the trial metrics.

* * * * *

UNITED STATES PATENT AND TRADEMARK OFFICE
CERTIFICATE OF CORRECTION

PATENT NO. : 7,227,907 B2
APPLICATION NO. : 10/386364
DATED : June 5, 2007
INVENTOR(S) : Proctor, Jr. et al.

It is certified that error appears in the above-identified patent and that said Letters Patent is hereby corrected as shown below:

ON THE FACE PAGE

At Item (56), U.S. PATENT DOCUMENTS, page 1, right column, line 2, after "8/2000", delete "Proctor et al." and insert therefor --Proctor, Jr. et al.--.

At Item (56), U.S. PATENT DOCUMENTS, page 1, right column, line 4, after "10/2001", delete "Proctor et al." and insert therefor --Proctor, Jr. et al.--.

At Item (56), U.S. PATENT DOCUMENTS, page 1, right column, line 8, after "10/2001", delete "Proctor et al." and insert therefor --Proctor, Jr. et al.--.

IN THE SPECIFICATION

At column 3, lines 42 & 43, after the word "follows.", delete "A description of preferred embodiments of the invention follows.".

At column 5, line 62, before the word "to determine", delete "are measured".

At column 7, line 14, before the word "active", delete "and" and insert therefor --an--.

At column 10, line 43, after the word "from", delete "an" and insert therefor --a--.

At column 10, line 60, before the words "to the", delete "response" and insert therefor --respond--.

UNITED STATES PATENT AND TRADEMARK OFFICE
CERTIFICATE OF CORRECTION

PATENT NO. : 7,227,907 B2
APPLICATION NO. : 10/386364
DATED : June 5, 2007
INVENTOR(S) : Proctor, Jr. et al.

It is certified that error appears in the above-identified patent and that said Letters Patent is hereby corrected as shown below:

IN THE SPECIFICATION (cont'd)

At column 11, line 7, before the word "minimized", delete "in" and insert therefor --is--.

Signed and Sealed this

Eighteenth Day of December, 2007

JON W. DUDAS
*Director of the United States Patent and Trademark Office*